W. CHICKEN.
Bark Cutting and Reducing Machine.
No. 220,274. Patented Oct. 7, 1879.
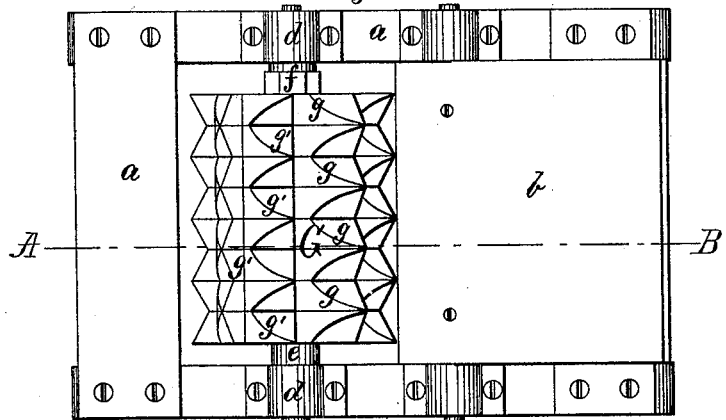
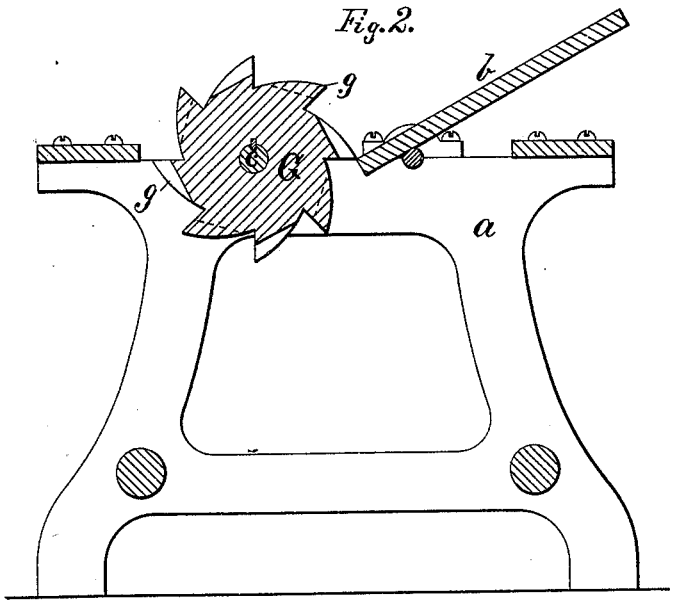
Witnesses:
Henry Chadburn.
John H. Foster.
Inventor:
William Chicken
by Alban Andrén
his atty.

UNITED STATES PATENT OFFICE.

WILLIAM CHICKEN, OF CHELSEA, MASSACHUSETTS.

IMPROVEMENT IN BARK CUTTING AND REDUCING MACHINES.

Specification forming part of Letters Patent No. 220,274, dated October 7, 1879; application filed March 10, 1879.

*To all whom it may concern:*

Be it known that I, WILLIAM CHICKEN, of Chelsea, in the county of Suffolk and State of Massachusetts, have invented certain new and useful Improvements in Bark-Cutting Machines; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to improvements in cutting-cylinders for bark-cutting machines; and it consists of a cutting-cylinder composed of a number of cutting-disks, located on an arbor or shaft. Each disk is toothed, and its teeth are alternately sharpened to the right and left to sharp edges. The said disks are secured to the central arbor or shaft in such a manner that the cutting part of the teeth join together in forming V-shaped teeth, and the spaces on each disk join together in forming V-spaces. In this manner a cutting-cylinder is produced having a V-space directly in front and behind each V-tooth, by which arrangement the clogging up of the bark when being ground is entirely prevented, and consequently the cylinder can be rotated for the purpose of cutting bark without much friction, and so as to cut the bark up more evenly and uniformly than could be accomplished on the ordinary bark-cutting machines. These improved cutting-disks may also be located in such a manner in relation to each other on the central arbor that the half V-spaces on one disk shall adjoin the half V-teeth on the next disk, and so on, in which position each disk will still have an alternate space and tooth following each other, for the purpose set forth.

In the accompanying drawings, Figure 1 represents a plan view of a bark-cutting machine provided with my improved cutting-cylinder. Fig. 2 represents a vertical section on the line A B, shown in Fig. 1. Fig. 3 represents a perspective view of one of the cutting-disks. Fig. 4 represents a perspective view of a pair of the said disks, so located in relation to each other that the teeth of the disks adjoin each other as well as the spaces, as shown; and Fig. 5 represents a perspective view of a pair of disks so located in relation to each other that the receding part of each tooth on one disk is in a line with the cutting-edge of the tooth on the other.

Similar letters refer to similar parts wherever they occur on the different parts of the drawings.

$a$ is the frame, and $b$ the feed-apron, of a bark-cutting machine, in the usual manner. $c$ is the rotary cutting-cylinder shaft, located in the bearings $d\ d$, as usual, and provided with collar $e$ and nut $f$, for securing the cutting-disks together in the usual way.

G is the improved cutting-cylinder, composed of the toothed disks $g\ g'\ g\ g'$, as shown. Each of said disks has every alternate tooth sharpened to the right and to the left, as shown, and for the purpose set forth.

By securing the disks together side by side on the arbor or shaft, in a manner as shown in Figs. 1 and 4, I obtain a cylinder in which V clearing-spaces are located between every successive V-tooth, in a manner and for the purpose set forth.

By locating the disks in a manner as shown in Fig. 5, I obtain the same result—namely, to have clearing-space between alternate right and left handed teeth—with this slight difference only, that the teeth and spaces become half as large as in the previous case, and consequently the bark will be cut up proportionately fine.

Having thus fully described the nature, construction, and operation of my invention, I wish to secure by Letters Patent, and claim—

A cutting-cylinder, G, composed of cutting-disks $g\ g'$, having their teeth alternately inclined to the right and left, and located side by side on an arbor, forming alternate V-teeth and clearing-spaces, as and for the purpose set forth and described.

In testimony that I claim the foregoing as my own invention I have affixed my signature in presence of two witnesses.

WILLIAM CHICKEN.

Witnesses:
ALBAN ANDRÉN,
HENRY CHADBOURN.